United States Patent
Olivares Arnaiz

(10) Patent No.: US 10,062,267 B2
(45) Date of Patent: Aug. 28, 2018

(54) SECURITY AND SURVEILLANCE SYSTEM BASED ON SMART PHONE DEVICES

(71) Applicant: DR. SECURITY S.L., Cerdanyola (Barcelona) (ES)

(72) Inventor: Fernando Jorge Olivares Arnaiz, Barcelona (ES)

(73) Assignee: DR. SECURITY S.L., Cerdanyola (Barcelona) (ES)

( * ) Notice: Subject to any disclaimer, the term of this patent is extended or adjusted under 35 U.S.C. 154(b) by 0 days.

(21) Appl. No.: 15/112,601

(22) PCT Filed: Jan. 20, 2015

(86) PCT No.: PCT/ES2015/000007
§ 371 (c)(1),
(2) Date: Jul. 19, 2016

(87) PCT Pub. No.: WO2015/107239
PCT Pub. Date: Jul. 23, 2015

(65) Prior Publication Data
US 2016/0343238 A1    Nov. 24, 2016

(30) Foreign Application Priority Data

Jan. 20, 2014   (ES) .................................. 201400046

(51) Int. Cl.
| | | |
|---|---|---|
| *G08B 25/01* | (2006.01) | |
| *G06F 17/30* | (2006.01) | |
| *G06F 21/35* | (2013.01) | |
| *H04L 29/06* | (2006.01) | |
| *H04N 7/18* | (2006.01) | |
| *H04M 1/725* | (2006.01) | |
| *H04W 4/02* | (2018.01) | |
| *G06F 21/55* | (2013.01) | |
| *H04W 4/90* | (2018.01) | |
| *H04W 4/80* | (2018.01) | |

(52) U.S. Cl.
CPC ........... *G08B 25/016* (2013.01); *G06F 17/30* (2013.01); *G06F 21/35* (2013.01); *G06F 21/554* (2013.01); *H04L 65/00* (2013.01); *H04M 1/72538* (2013.01); *H04N 7/185* (2013.01); *H04N 7/188* (2013.01); *H04W 4/02* (2013.01); *H04W 4/80* (2018.02); *H04W 4/90* (2018.02); *G06F 2221/2111* (2013.01); *H04M 1/72541* (2013.01); *H04M 1/72572* (2013.01)

(58) Field of Classification Search
CPC ..... H04W 16/14; H04W 74/08; H04W 74/04; H04W 16/00; H04W 24/02; H04W 88/08; H04W 4/80; H04W 4/90; H04W 4/02; G08B 25/016; G06F 17/30; G06F 21/35; G06F 21/554; H04L 65/00; H04N 7/188; H04N 7/185; H04M 1/72538
See application file for complete search history.

(56) References Cited

U.S. PATENT DOCUMENTS

| | | |
|---|---|---|
| 8,538,374 B1 | 9/2013 | Haimo et al. |
| 2005/0075116 A1 | 4/2005 | Laird et al. |
| 2012/0094628 A1 | 4/2012 | Mader et al. |
| 2013/0183924 A1 | 7/2013 | Saigh et al. |
| 2013/0307685 A1 | 11/2013 | Sholder |

FOREIGN PATENT DOCUMENTS

EP   2613575 A1   7/2013

OTHER PUBLICATIONS

International Search Report dated Feb. 26, 2015 for PCT/ES2015/000007 and English translation.
Written Opinion dated Feb. 26, 2015 (no English translation).

*Primary Examiner* — Nam Huynh
(74) *Attorney, Agent, or Firm* — Lucas & Mercanti, LLP

(57) ABSTRACT

Security and surveillance system based on smart phones devices, of the type of devices having capacity for communications with a wide area network, such as the Internet or telephony, being able to load and run an operating procedure as a module or downloadable application, and being provided with services such as a screen, a photo camera, GPS; for example: smart phones, tablets, GPS, etc.; wherein said module includes procedures for enabling and make the phone services accessible and a bidirectional communication with a remote control center or a specific user, via the Internet; said module or modules including different security procedures linking the device with a security data base having geolocated data which adapt the response to the emergencies occurred by means of procedures protocols.

20 Claims, No Drawings

SECURITY AND SURVEILLANCE SYSTEM BASED ON SMART PHONE DEVICES

CROSS REFERENCE TO RELATED APPLICATION

This Application is a 371 of PCT/ES2015/000007 filed on Jan. 20, 2015, which claims priority of Spanish Application No. P201400046 filed Jan. 20, 2014, both of which are incorporated herein by reference.

FIELD OF THE INVENTION

The present invention develops a security and surveillance system based on smart phone devices, that is, mobile telephony devices, smart phones, tablets, etc., fitted with a camera, GPS, built-in microphone and communication with a wide area network such as the Internet or a mobile telephony network, wherein said devices are integrated in a centralized security system.

BACKGROUND

Security alarms establish a safety perimeter having detection means wherein, upon a security breach in said perimeter, the alarm is activated. These types of systems usually have the problem of false positives, so the art has evolved by incorporating surveillance cameras as detection and verification elements for the remote monitoring to determine whether or not there is indeed an emergency situation.

There are numerous monitoring and security applications which use cable-connected or wirelessly connected fixed cameras, being associated in a closed circuit video which performs monitoring either from a screen or a centralized group of screens receiving said signals, or else remotely from a remote control centre which receives the transmitted signal from a module emitting said video signals.

In these systems, featuring expensive equipment which require expensive installation, the operational parameters are conditioned by the hardware structure itself and the operation characteristics thereof.

There are also known surveillance video cameras being ready to incorporate to a local network, of the TCOP/IP type, by means of a WIFi or wired transmission. These units send their images to a central unit which manages the operational procedures of the alarm, which can eventually be linked to a remote security centre managing said security system.

These systems of network-linked video cameras are also known without featuring a private security server. The central unit in these cases send the images to its own server or to a public image box, such as a WebCam, it can even send an SMS message to the user, in such a way that it can verify the situation to be controlled.

In practice, said systems continue being expensive both regarding installation and configuration, and regarding the equipment involved. Furthermore, they are not very flexible since their functions are previously configured, and both the user and the security centre simply make use of those, with a complex change of equipment being required to set the functionality thereof.

One of the main objects of the present invention is the use of the numerous amount of mobile phones fitted with a camera which exist both in the market and in the users hands to establish an inexpensive security and video surveillance system, being adjustable to the different needs of the users and efficient in terms of the performance thereof being obtained.

It is also a main object of the present invention that said personal mobile phone network can connect to integrate a centralized and monitored surveillance system.

Another object of the present invention is that the procedures included in such a system are configured as modules that the users can download from the Internet, a Web site or an Application Server so as to adapt their security system to their needs.

Thus, another main object of the present invention is the easiness to adapt the devices used to the function thereof by means of methods which can be downloaded as modules. That is, the possibility of configuring the system and the devices, being also possible to modify said configuration data.

Another object of the present invention is to allow incorporation into a security system of products regarded as heterogeneous for the functionality thereof: mobile phones or tablets, etc.;

also regarded as heterogeneous in terms of the working operating system thereof: Android, Blackberry, IOS, Symbian, etc.

It is also another main object of the present invention that said devices are integrated into a security system associated to moving condition of the user which is using them, thereby being configured as a personal adviser or security device in journeys and trips.

These and other objects of the present invention will become apparent throughout the following description.

BRIEF EXPLANATION OF THE INVENTION

The present invention describes a personal security system based on smart mobile devices, for example, mobile telephony devices, smart phones, tablets, etc., fitted with a camera and wireless communication to a wide area network such as the Internet or a mobile telephony network, wherein said devices, by means of a downloadable module, adopt the functionalities of a terminal having security and surveillance functions.

Said module incorporates the procedures to turn the camera or cameras of the mobile device or of a peripheral device connected thereto, into a video surveillance camera, including the capacity to operate different security procedures from the present invention, as it will be further explained below, as well as the possibilities of externally linking said surveillance terminal or terminals, as appropriate, to other devices or monitoring centre through a wide area network such as the Internet.

In one of the possible preferred embodiments of the invention, different mobile phones are located in positions selected by the user, each of them using the procedures of the system of the invention. Said procedures, which are included in a module incorporated in said telephones, enable the photo cameras of said devices as a motion detection camera, allow video and audio recording and taking shots not only on demand, but in response to the motion detection in the vision area thereof.

All these surveillance terminals now, can be linked to another terminal acting as a station and as a communication centre to communicate with a remote security centre, by means of safe communication protocols identifying the information content and the origin thereof, according to communication technology and data encryption standards.

The existing procedures in the system activate the communication and remote control of said terminals that can perform video and audio recording and take photograph shots, and even emit sound and/or light warning signals.

Conventional sound alarms can be linked to the system as well as other means, spotlights, mobile objects, etc., which are triggered by means of a command from the security centre or automatically upon fulfilling certain assumptions considered as intrusion and a breach in security. This system also allows recording of events as a preventive action for security.

Versatility of the present invention makes it possible for windows to be displayed in situations wherein the user of the mobile device is moving, such that the procedures being incorporated in the present system allows that this is a true security personal advisor in journeys and trips, warning about going through or getting near a dangerous area, informing how to have access to specific aid the quickest possible, alerting the near security services, activating the civil protection services for local, national, etc. emergency situations.

Thus, all the objects searched by the invention have been obtained, these allowing the creation of a security and surveillance system by using the means incorporated in the mobile telephony devices, even in disused equipment, having a very satisfactory result regarding the efficiency thereof, in a system being adjustable together with a reduced cost.

DETAILED EXPLANATION OF THE INVENTION

The present invention consists of a security system based on smart phone devices, for example mobile telephony devices, smart phones, tablets, etc., comprising a wide area network as the Internet or a mobile telephony network, having different services such as those from a photo camera, etc., wherein devices are integrated in a centralized security system.

When the present invention refers to smart mobile devices it means mobile devices, mainly mobile phones, including access to a wide area network, such as the Internet or a mobile telephony network, being provided with different services such as those from one or several photograph cameras, GPS, etc. This includes tablets and other similar devices incorporating communications, photo camera, GPS positioning, motion and acceleration sensors, etc., as well as the capacity to receive operation instructions through a downloadable program module.

In a practical embodiment example, a downloadable module comprising the procedures of the system of the present invention is downloaded from a mobile phone fitted with a photo camera, through a web service for downloading applications or from a PC and transferring it afterwards to the telephone. The telephone is placed with the photo camera pointing to the surveillance area, with said module being activated which, by means of the options included therein, establishes the relationship with a security control centre and the operation parameters thereof.

Said downloadable module includes an API (Application Programming Interface) typical for security functions, having an interface for each host operating system in order to facilitate the operation and maintenance of the system procedures. Obviously, the methods of the system of the invention could be written in a specific program for each telephone platform, but that does not substantially alter the procedure in terms of the present invention.

The procedures incorporated in said module include:
enabling telephone communications to make it accessible and remotely activate or deactivate the functions thereof, and to receive the information captured by said mobile in the different services thereof: photo cameras, sound, etc.

motion detection by detecting sufficient modification of the pixel map of the image captured by the camera or cameras of the phone.

processes for compressing the information to be transmitted and decompressing the information received, in order to diminish the data bandwidth required for the transmission of information; this includes encryption of said information, using safe encryption means, according to the technical field, which identifies the equipment emitting the information and validates said information, enabling other functionalities or existing services in said telephone or mobile device, as it can be the case of a flash light, the phone speakers, a GPS, etc., depending on the nature and features of each device and of the security procedure used.

Thus, the user can use disused mobile phones, tablets, etc., so as to configure a security network. They can even decide at each moment the number of devices that there will be employed in this task and the location thereof. For example, while sleeping they can use their favourite tablet to supervise an area of their house or garden, and the next day disconnect it from the security network and take it to work with them.

Additionally, with the system of the invention a great control is achieved over the security parameters and means which are in the hands of the final user, who can choose different security companies offering a central security service within the parameters of the present invention, without said choice for a centralized security provider representing the modification of all the equipment and a high investment associated to each change of provider.

Furthermore, the present invention, by means of suitable downloadable modules, allows configuration of different security environments using mobile devices, enabling, for example, to do without the centralized security server and that the users themselves play that role, for example by receiving all security alerts to a web page by means of instant messaging, such as SMS, or by sending data to their personal phone, they can even access, with the suitable procedures, from their telephone to the visualizing and control functions of the security devices located in their house.

All that is possible thanks to the circumstance that the present invention, in fact, represents an incorporation of flexibility, through security procedures being downloadable in program modules with respect to the previous technology where hardware and procedures (software) are strongly related.

The solution provided by the present invention is feasible because there is a great number of mobile phones and other smart devices in the users hands which can be used to establish a security network based thereon. Furthermore, said devices can be programmable and, through said programs, their physical functions, such as photo cameras, or the audio according to the operating system thereof, become accessible.

In practice, said operating system of each device Android, Symbian, Blackberry, IOS, Windows, etc.,), includes the means and/or functions to access the telephone characteristics. A simple solution, although not the only one, is to create an interface between each own API including the procedures of the present invention, thus said own procedures are common to all platforms and the only modification to be done is adaptation or translation thereof to each family of products. This functional specialization allows an optimal distribution of the work between the computer expert and the security expert so as to configure the system for each practical case.

In other of the possible and main cases of the practical embodiment of the present invention, the system is especially configured for situations where a device is being displaced. The procedures included in the present invention allow adapting to this situation and being configured as a security/emergency alarm/alert emitting personal adviser.

Particularly, as in the previous case of a preferred embodiment, the application or module being downloaded in the device allows that a control centre or security centre can access the telephone functionalities or services. Thus, different situations may arise when the user, being registered in the system and using the procedures of the invention, activates different security and emergency services.

In different ways of using the mobile device in the context of the invention, or as a pre-established method to generate an alert or emergency activation in the system, a timer is used. It is intended to configure the time (hour, minute, second) after which the device, once an alert situation is activated, will send an emergency signal if it is not instructed otherwise.

The invention allows the security procedures to be deactivated and with no monitoring of the device state.

The invention comprises an activation process of the emergency and/or alarm procedures by pressing a button activating said procedures, said "SOS" icon/button being provided in the touch screen of the device. The invention provides, in case the user decides so, a double check control for the "SOS" button activation requesting, for example, to press the button a second time in the device.

The invention provides other ways of activating the emergency procedures different to the SOS button.

Thus, the system of the invention contemplates configuration conditions in which disconnecting the headphones connecting cable acts as a virtual micro switch. When the headphones cable is disconnected, a count-down, being pre-set by the user, would activate which, if it is not deactivated by using a secret code, would send the SOS signal to the server.

The system also allows deferred activation of an alerting signal. The users will be ready, whenever they consider to be accessing a dangerous area, to indicate the system a period of time after which, and provided the corresponding cancellation has not been done, it will make the application to automatically generate an alert.

Another possible way of activating the emergency alarm, provided for situations in which the user is driving a motor vehicle or a passenger therein, is detection of a significant and sudden deceleration, measured by means of inertial sensors in the device or by means of geolocation measurements from the GPS, which would be an indication of a car accident, and would thereby cause the signals and procedures corresponding to that emergency to be emitted.

Another means activating the emergency situation used by the invention, suitable for identifying a user falling off the same or different level, is detecting, using an accelerometer, inertia or any other suitable means, that the mobile device has been dropped.

The application also allows activation of an alert signal to be sent when it detects that the device is receiving hits having a particular rhythm and strength. When the user hits the device following this specific pattern the application will generate an alert.

Another embodiment uses a physical alarm button, placed in any convenient place in a vehicle, working place, leisure centre or home being connected to the system, for example, by means of Bluetooth. Upon pressing it an alarm can be activated.

The present invention also contemplates the connection to the system, for example by means of Bluetooth, of a cardiac rhythm sensor or detector. Monitoring the cardiac rhythm of a person by means of this mechanism, upon reaching a pre-established threshold value, allows activation of the alarm and the corresponding emergency procedures.

The system of the present invention contemplates that the different activation systems of the alarm and of the emergency procedures can be activated and act independently from each other. The terminals or devices will send independent signals for each type of emergency, or otherwise the user will previously cancel said alarms before they are sent, if they desire so and if it has been established so.

It is also possible to have different monitoring degrees of the device, having specific services attributed to each of said monitoring degrees. For example, GPS monitoring and security message by instant messaging, or in another case active monitoring, for example when the users activate said state because they feel they are being followed or that they are in danger, or because they go through a specially compromised area regarding security, etc.

In general, the present invention incorporates in the module or application being downloaded in the device and executed therein, a set of stages that, within the capacities being provided by the physical equipment and the corresponding operating system, comprise:

enabling the services available in said devices: photo camera or cameras, flash, GPS, microphone and speakers.

means to enable the photo camera or cameras of the devices as surveillance cameras with video motion detection procedures which allow establishing a bidirectional communication among said devices and at least one control centre said communication can include recorded video images, photo shots, sound, voice and action instructions about the services being available in the device said communication will be compressed and encrypted, codified source stamp and content according to the art an operative procedure relating the device location with a security geographical locations data base, determining which are the nearest service centres related to an emergency, according to each type of emergency.

said device location compared to a hierarchy of geolocated security levels included in that security data base, according to the type of emergency and depending of the season of the year, day of the week and time of the day the assessment of emergency by said control centre and typifying thereof action instructions about said device services in response to the emergency situation previously determined.

The system of the invention establishes a local security network linking different mobile devices units, each one of them configured according to claim by means of said module or application, wherein each element of said security network is identified with a log in ID, and with the control centre operating with each of those devices.

At least one of said control centres can be a remote centre linked via the Internet or another wide area network, such as mobile telephony (GSM, 3G, 4G, etc.).

In response to a an emergency situation said control centre, according to the operative protocols being established, will be ready to command to proceed with the video recording, photo shots, sending of sound messages and/or activation of other security elements existing in said local network, such as alarms, lights, etc.

When an emergency situation is produced, both as in the first case of a fixed local security network, and in the case of a user moving along with a security mobile device, a set of procedures are performed.

- an operative system relating the device location with a security geographical locations data base, determining which are the nearest service centres related to an emergency, according to each type of emergency.
- assessment of the device location according to the hazard level thereof according to said security data base and the type of emergency.
- assessment of the emergency by said control centre and typifying thereof.
- Operational instructions about said device services in response to the emergency situation previously determined.

Once said control centre establishes the emergency typifying of the emergency or alert being produced, a list of actions is executed, which have been preconfigured in a security data base relating type of emergency, geographical locations and actions to be done. Said actions include communication with the user and transmission on their screen of instructions related to the emergency occurred.

Regarding the response to an emergency o security situation, the potential the present invention features and which exist in enabling characteristics of the smart mobile device is huge. This goes from calling the user to proceed with a certain evaluation of the emergency situation, giving advice and/or offer an action to proceed with.

Voice messages and flash light activation of the device, sound alarms, etc., can be used according to the available services in each device.

The invention provides activation and operation of other devices linked to the security local network and being accessible via WIFI or other communication protocols, and of an interface gateway thereto. This allows, for example, activation and deactivation of a conventional alarm or any other device electronically controlled, such as home lights controlled through a home robotics interface, TV, or movement of a radio-controlled object.

Actions included in the present invention provide the possibility of simulating a device malfunction, such that even when it seems to be inoperative it continues offering data of the location thereof, even images and audio transmission. This, doubtlessly, can offer various advantages regarding monitoring of an emergency associated to a crime, wherein arresting the criminals can be made easier.

Another procedure included in the system of the present invention consists of using the recording means of the camera as video-prevention, in such a way that in case the user is in need of registering images instantly and as a preventive action regarding an event which can be considered eventual and counterproductive, an image recording sequence will start which will be automatically uploaded to the server, in case subsequent direct use thereof may be needed by the monitoring centre.

The invention also contemplates different levels of administration or supervising service. According to this, the invention makes it possible to establish an intermediate category of administration centres or administrators, located between the individual device or the security local network and the centralized control and security centre. Thus, a user or group of users are linked to a category of "super-administrator", against other users, for example, to configure and establish a geographical area or distance regarding other users, allowing the system, in case other users move away from said user or group, or overpass said distance, to send a alert to said administrator warning about someone being separated from the group and if that person is within an area having certain hazard risk.

The invention also contemplates proving the user, duly identified and authorized, of the geolocation functions and remote control of the mobile device functionalities described above. Thanks to this, the user will be able to establish the remote location of their device/s and to perform actions on them including locking the device, generating sound or light alerts, activation of the microphone and/or camera, recording or sending sound recordings, photos or videos, making phone calls or sending an SMS, as well as dumping and retrieving the information contained therein.

Finally, the above security data base contains security geolocation data linking geographical locations, streets, city addresses, etc., having a preconfigured security hierarchy discriminating locations depending on the danger they involve, considering said danger also depending on the season of the year, day of the week and time of the day. The security data base geolocationally saves, in KML data or similar, said security assessment.

Thus, when a device inputs, according the communication features thereof, the geographical location thereof in the system, sending it to the centralized control centre, it is automatically correlated with the security hierarchy therefor, activating the corresponding security functions associated to said danger.

This is critical to execute the function of security recommendation or actions to take or take into account before a possible danger. This way of structuring security information allows an immediate and automatic response from the system, which improves the eventual transmission delays among the units being involved, and provides information and action to be taken in real time.

A practical embodiment of this function is represented by user visiting a city which is unknown to them. Said city is included in the data base of the present invention, and it is mapped in the security hierarchy of the present system. When the users, for caution reasons, activate the security monitoring function of the present invention, for example, they are immediately informed of the potential risk of security which they have according to the place they are located in, they can even receive a message in the form of a recommended route and the areas to avoid. This planning feature could not be offered in real time without the access to the information from the security data base of the present invention.

Naturally, many other security functions are possible, which generally benefit from the security data base having geolocated data of the present invention, using the geolocated information acquisition rate characteristic of the present invention.

The system of the invention, therefore, is susceptible of adopting different embodiments and responding to different security demands, by incorporating in practice habitual procedures, through a downloadable application, and, optionally, by incorporating additional features specific to particular situations into additional procedure modules.

The system is, therefore, versatile and efficient, featuring very reduced costs for the application thereof, while offering novel features regarding security, which do not exist currently or which can be implemented only using expensive equipment and services dedicated to security.

It is understood that those finish and shape modifications not altering the essence thereof are included in the scope of the invention.

The invention claimed is:

1. Security and surveillance system based on smart mobile devices comprising:
   one or more smart mobile devices including calculation capacity and information processing, having capacity for communications with a wide area network configured to load and run an operating procedure as an application module and being provided with a photo camera, microphone, and a GPS, said application module configured for:
      enabling the services available in the one or more smart mobile devices,
      establishing a bidirectional communication between the one or more smart mobile devices and a control center,
      sending a device location to the control center of the one or more smart mobile devices; and
   the control center configured for:
      receiving the device location sent from the one or more smart mobile devices,
      determining an emergency situation by relating the device location with a security geographical locations data base including an assessment of a hazard for each geographical position and type of emergency according to a preconfigured ordered hierarchy according to the season of the year, day of the week and time of the day,
      determining action instructions about the services available in the one or more smart mobile devices in response to the emergency situation, and
      transmitting the action instructions to the one or more smart mobile devices.

2. Security and surveillance system based on smart mobile devices according to claim 1, wherein the security geographical data base is provided with the action instructions about the services from the smart mobile devices in response to the emergency situation.

3. Security and surveillance system based on smart mobile devices according to claim 1, further comprising means to enable a photo camera or cameras of the smart mobile devices as surveillance cameras having video motion detection.

4. Security and surveillance system based on smart mobile phones devices according to claim 3, wherein the bidirectional communication among said smart mobile devices and the control center includes video images, photo shots, audio, voice and action instructions about the services available in the smart mobile device.

5. Security and surveillance system based on smart mobile devices according to claim 4, wherein the bidirectional communication between the smart mobile devices and the control center is compressed and encrypted, being source stamp and content-codified.

6. Security and surveillance system based on smart mobile devices according to claim 1, wherein a local security network is established by linking different units of the smart mobile devices, each one of the smart mobile devices configured by means of the application module, wherein each element of the local security network is identified with a log in ID, and with the control center operating with each of the smart mobile devices.

7. Security and surveillance system based on smart mobile devices according to claim 1, further comprising means and procedures for the system to enable and use other devices wirelessly connected.

8. Security and surveillance system based on smart mobile devices according to claim 1, wherein the control center is a remote center linked through the Internet.

9. Security and surveillance system based on smart mobile devices according to claim 1, further comprising different levels of administration or supervising central service, wherein a user or group of users are linked to a category of administrator against other users to configure and establish a geographical area or distance regarding other users, and to generate a security alert when other users move away from the geographical area or overpass the distance.

10. Method of security and surveillance system based on smart mobile devices according to claim 1, further comprising an activating procedure for an alarm and/or an emergency.

11. Method of security and surveillance system based on smart mobile devices according to claim 10, wherein the activation of the alarm and emergency procedures require a double check process for verification thereof requesting pressing the device.

12. Method of security and surveillance system based on smart mobile devices according to claim 10, wherein the activation of the alarm and emergency procedures is produced by pressing a button/icon on a screen of one of the smart mobile devices.

13. Method of security and surveillance system based on smart mobile devices according to claim 10, wherein the activation of the alarm is associated to a count-down establishing an opportunity to cancel the alarm.

14. Method of security and surveillance system based on smart mobile devices according to claim 10, wherein the activation of the alarm and emergency procedures are produced by disconnecting a headphones connector cable which acts as a virtual micro switch so that when the headphones connector cable is disconnected a count-down is activated, pre-established by the user, wherein if the count-down is not deactivated by using a secret code, a SOS signal is sent to the control center.

15. Method of security and surveillance system based on smart mobile devices according to claim 10, wherein the activation of the alarm and emergency procedures are produced by detecting a fall of the smart mobile device detected by an accelerometer.

16. Method of security and surveillance system based on smart mobile devices according to claim 10, wherein the activation of the alarm and emergency procedures are produced by detecting a pre-established rhythm of hits on the smart mobile device.

17. Method of security and surveillance system based on smart mobile devices according to claim 10, wherein the activation of the alarm and emergency procedures are produced, in situations wherein a vehicle is being used, either as a driver or passenger, by detecting a significant and sudden change in velocity, obtained from the smart mobile device, in which case signals and procedures corresponding to a car accident emergency are emitted.

18. Method of security and surveillance system based on smart mobile devices according to claim 10, wherein the smart mobile devices allows connection both directly and wirelessly, to external components, comprising buttons or cardiac rhythm sensors, which under specific conditions emit signals and procedures corresponding to a typified emergency.

19. Method of security and surveillance system based on smart mobile devices according to claim 10, wherein a security data base correlates the type of emergency, geographical situations, and pre-configured actions that must be carried out.

20. Method of security and surveillance system based on smart mobile devices according to claim 19, wherein the pre-configured actions include communication to the user and transmitting instructions to the smart mobile devices.

* * * * *